July 7, 1925.
C. T. HANSEN
CAR SEAT CONSTRUCTION
Filed Dec. 27, 1923
1,545,097
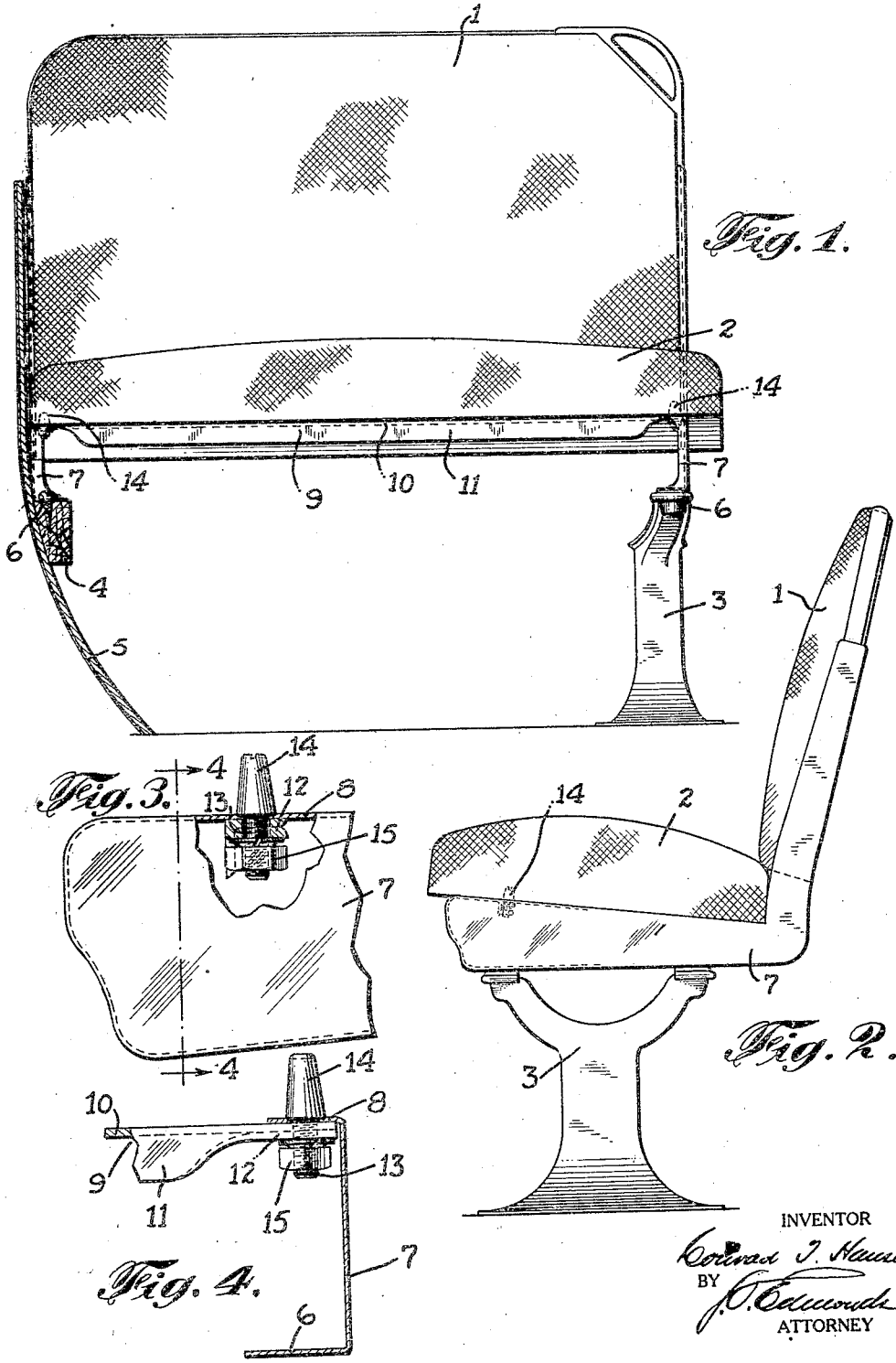

Patented July 7, 1925.

1,545,097

UNITED STATES PATENT OFFICE.

CONRAD T. HANSEN, OF DETROIT, MICHIGAN, ASSIGNOR TO THE AMERICAN MOTOR BODY CORPORATION, OF PHILADELPHIA, PENNSYLVANIA, A CORPORATION OF DELAWARE.

CAR-SEAT CONSTRUCTION.

Application filed December 27, 1923. Serial No. 682,887.

*To all whom it may concern:*

Be it known that I, CONRAD T. HANSEN, a citizen of the United States, residing at Detroit, in the county of Wayne and State of Michigan, have invented certain new and useful Improvements in Car-Seat Constructions, of which the following is a specification.

This invention relates to car seat construction, and more particularly relates to the seat cushion supporting portion thereof.

One type of cushion supporting structure heretofore employed comprises two end members of thin, pressed steel, each having upper and lower flanges, with cushion locating pins riveted on the upper flanges. The ends of the seat cushion rest on these upper flanges and are supported thereby, and there is no cross support for the cushion. Usually a spreader brace or tie rod extends between and is bolted to the lower flanges of the end members. It has been impractical to attach the spreader brace or tie rod to the upper flanges of the end members, where it might afford a cross support for the cushion, for the reason that the bolt heads would project above the flanges, making the surfaces uneven and undesirable as resting surfaces for the cushion. On account of there being no cross support for the seat cushion, the front cross frame member thereof, usually wooden, often breaks under the strains of usage, thus rendering the seat useless, and requiring repair or the installation of a new seat cushion.

The objects of my invention include the provision of a car seat having a cushion supporting structure which is simple and economical to manufacture and to install; a structure which is thoroughly reenforced and braced; and one which gives extended support and reenforcement to the seat cushion and at the same time is equipped with cushion locating and retaining pins. More specifically, one object of my invention is to provide a combination cushion pin or dowel and spreader brace bolt adapted to be incorporated in seat cushion supporting structure to provide a pin for the seat cushion and at the same time to serve as means for securing a cross spreader brace or tie rod in supporting position beneath the cushion without rendering the resting surfaces for the cushion objectionably uneven or less desirable. Other objects of my invention will be in part obvious and in part pointed out hereinafter.

The invention accordingly consists in the features of construction, combinations of elements and arrangement of parts which will be exemplified in the construction hereinafter set forth and the scope of the application of which will be indicated in the following claim.

In order that a clearer understanding of my invention may be had, attention is hereby directed to the accompanying drawings, forming a part of this application and illustrating one possible embodiment of my invention. Referring to the drawings, Fig. 1 is a front view of a car seat having seat cushion supporting structure embodying my invention; Fig. 2 is an end view of the same; Fig. 3 is an enlarged fragmentary detail view showing the combined cushion pin and spreader brace bolt and associated parts; and Fig. 4 is a sectional view of the same, and is taken on the line 4—4 of Fig. 3. Similar reference characters refer to similar parts throughout the several views of the drawings.

Referring to the drawings, there is shown a car seat having a stationary back 1 and a removable seat cushion 2. Under one end of the seat is a pedestal 3, and under the other end of the seat is a rail 4 which is attached to the car wall 5. Instead of the rail 4 another pedestal may be employed. To the top of the pedestal 3 and rail 4 are rigidly attached the lower horizontal flanges 6 of metallic end members 7, which also have upper horizontal flanges 8, upon which the ends of the cushion 2 rest. A spreader brace or tie rod 9 extends between, and is attached to these upper flanges of the two end members 7, reenforcing and bracing the end members and flanges, and at the same time is so located that the front of the seat cushion 2 will rest thereon and will be supported and reenforced thereby. Such spreader brace 9 may be angle shaped in cross section, presenting a flat, horizontal flange 10 beneath the front of cross frame member of the seat cushion, and a vertical flange 11 which curves into horizontal position beneath the horizontal flange 10 at each end of the brace, as at 12, thus forming attachment portions of double thickness. These ends 12 and the upper flanges 8 of the supporting members 7 are provided with aligning bolt holes through which the shank 13 of a bolt is adapted to extend. The head 14 of the bolt is of special shape, being in the form of, and constituting, a cushion pin or dowel for the seat cushion, which is suitably recessed to receive it. Accordingly, the head of the bolt is preferably elongated, circular, and tapering. It will be evident that by means of such special bolts and their cooperating nuts 15, the spreader brace 9 may be securely attached to the upper flanges 8 of the supporting member 7 at each end of the seat, and at the same time the combination dowels and bolt heads will be firmly positioned in the proper positions on these flanges to locate the seat cushion, without creating objectionable unevenness on any of the supporting surfaces for the cushion. The attachment of the spreader brace to the upper flanges of the end members 7 not only provides a better reenforcement for these members, but also places the brace in position to reenforce and support the seat cushion crosswise. This construction also avoids the necessity of riveting or welding separate dowels to the end members, since the dowels constitute the heads of the bolts, and their threaded shanks in conjunction with the nuts comprise attachment means therefor.

What I claim is:—

In seat construction, the combination with a seat cushion having recesses for cushion pins, of end members having seat supporting flanges beneath each end of the cushion, a cross brace having a seat supporting flange crosswise beneath said cushion, and bolts securing said cross brace and said end members together, said bolts having heads in the form of cushion pins located on said end members in position to enter said recesses in the seat cushion.

This specification signed this 17th day of December, 1923.

CONRAD T. HANSEN.